July 19, 1949.    J. E. CHARNES    2,476,817
SECTIONAL CURING BAG AND METHOD OF MAKING SAME
Filed Feb. 1, 1945    2 Sheets-Sheet 1
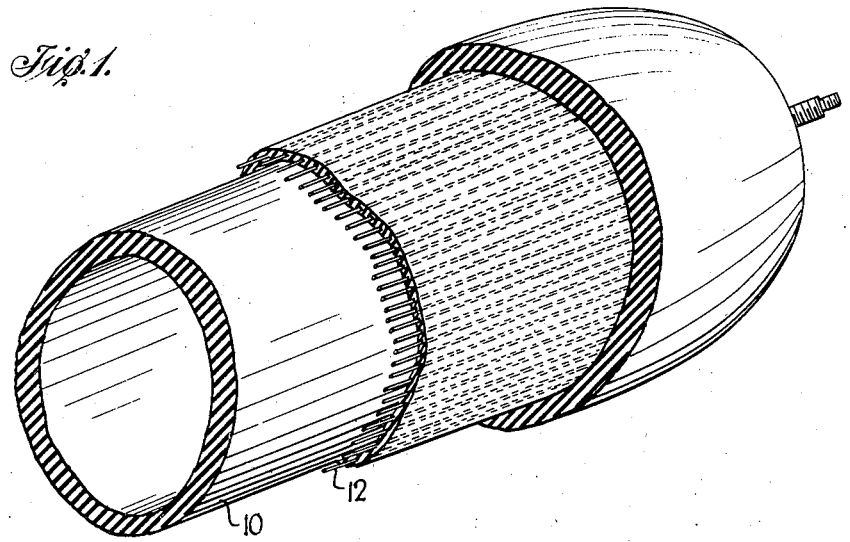
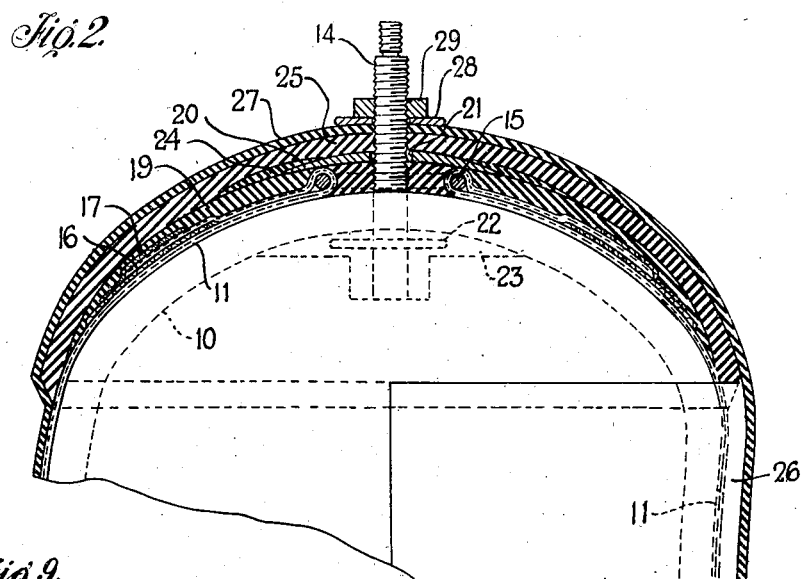
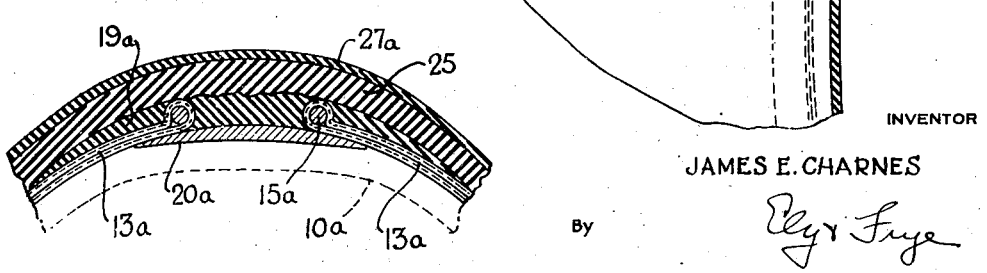
INVENTOR
JAMES E. CHARNES
ATTORNEYS July 19, 1949. J. E. CHARNES 2,476,817
SECTIONAL CURING BAG AND METHOD OF MAKING SAME
Filed Feb. 1, 1945 2 Sheets—Sheet 2
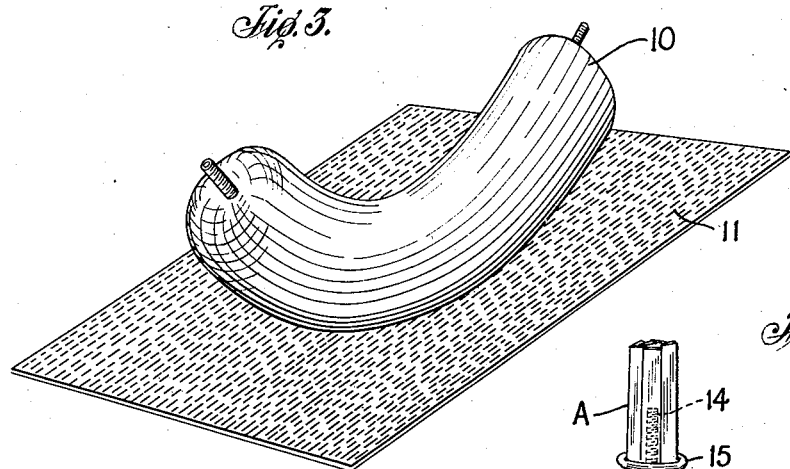
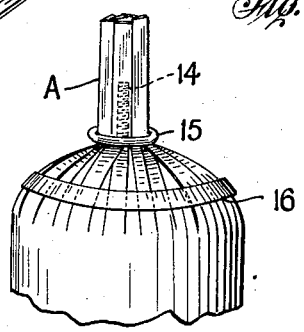
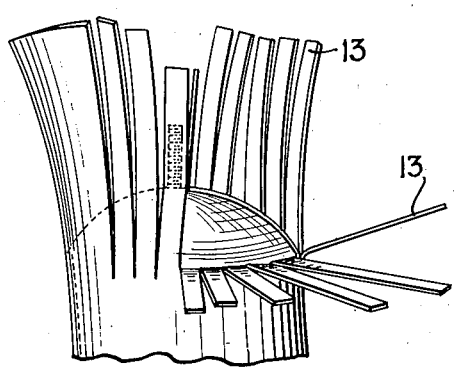
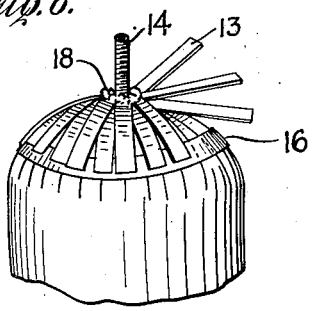
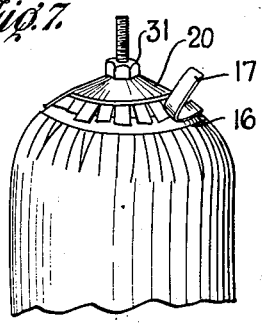
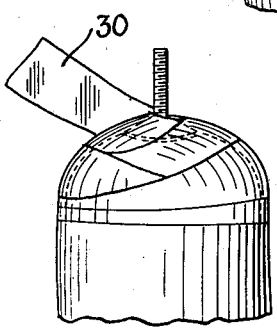
INVENTOR
JAMES E. CHARNES
BY
ATTORNEYS Patented July 19, 1949

2,476,817

UNITED STATES PATENT OFFICE 2,476,817

SECTIONAL CURING BAG AND METHOD OF MAKING SAME

James E. Charnes, Akron, Ohio, assignor to The Firestone Tire & Rubber Company, Akron, Ohio, a corporation of Ohio Application February 1, 1945, Serial No. 575,590

11 Claims. (Cl. 18—45)

This invention relates to improvements in sectional curing bags and to methods of constructing such articles, and comprehends particularly that class of bags adapted for use in effecting expansion of a portion of a tire casing against its mold during the process of molding and vulcanizing a sectional tire repair.

In making sectional tire repairs unvulcanized rubber is employed in the form of rubber strips, sheets, and as rubberizing material for fabric used. In order to obtain satisfactory results from rubber in a sectional tire repair the rubber must be vulcanized under pressure. To subject said rubber to pressure during said molding and vulcanization a repair man ordinarily employs a sectional curing bag connected directly to a continuous supply of air or steam pressure during the time the bag is in working position. Regardless of the pressure medium used, a relatively high internal pressure, as for example from 60# to 125#, is necessary for proper tire repairing results.

In respect to length, sectional curing bags are made in one-fifth or one-sixth of a circle with closed ends through which inlet and outlet valve stems extend. The outside cross sectional contour of a curing bag conforms as closely as practicable to the inside cross sectional contour of the tire at the time and in which the bag is used. In service the base of a sectional curing bag is supported by a rigid curing ring and the bag's side and tread portion press the tire radially outwardly against a rigid tire mold. However, the end portions of the bag generally do not have any external support but must depend on longitudinally extending reinforcing or strain-bearing elements, which elements heretofore have been in the form of cords of cord tire fabric, or of wires. It is to be understood, however, that the present invention contemplates the use of such strain members as rayon or nylon cord, metal strips, or any type of strain member which lends itself to use in the construction of applicant's curing bag.

In order to be satisfactory, a curing bag must not leak during its use in a tire repair operation as such leaking would spoil the work. The bag must also transmit the desired pressure against the repair work as otherwise a satisfactory repair cannot be made. Also, the bag must be economical to use. Curing bags are repeatedly subjected to vulcanizing temperatures and their end portions are subjected to high internal pressure without external support. One principal cause of sectional curing bag failures is the internal end pressure causing the longitudinally extending reinforcing or strain members to slip their anchorage at the ends of said bags. Heretofore it has been customary to anchor said strain members at the ends of a preshaped closed-end inner tube or core over which said strain members are built in a manner well known to those familiar with the art. For example, a well known and common method is to rubberize cord tire building fabric, in a manner similar to that used in rubberizing cord tire plies, and then enclosing said preshaped tube or core in one or more plies of said fabric with the cords extending lengthwise of said tube or core. The said ply or plies are of proper length to permit their end portions to be divided by separating small groups of cords into a plurality of strips which strips may be folded over and about the ends of said tube or core, whereby said end portions become, after molding and vulcanization, anchored to said strain members. In practice, however, this anchorage has not been entirely satisfactory and many bag failures occur as a result of the internal bag pressure forcing the ends of the bag axially outwardly until the union between the strain members and the ends of the tube or core are ruptured, and the internal pressure medium escapes through such rupture or ruptures which may be in either one or both ends of the bag.

It is an object of the present invention to provide curing bags wherein the strain members are positively anchored over the ends of the expansible inner tube or core of said bag.

Another object of the present invention is to provide in a sectional curing bag improved anchoring means for wire strain members.

Another object of the invention is directed toward providing in a curing bag embodying longitudinally extending reinforcing or strain members certain structural features designed respectively to strengthen the end portions of the bag without impairing the bag's ability to expand radially along its entire length.

In the drawings, accompanying and forming a part of this specification and wherein one practical embodiment of the invention and one modification thereof is shown:

Fig. 1 is a perspective view of a portion of a curing bag embodying wire strain members, with portions of the curing bag cut away to show the construction thereof;

Fig. 2 is a fragmentary view, on a scale somewhat larger than Fig. 1, partly in longitudinal section showing the construction of the curing bag at an end having a valve stem extending therethrough;

Figs. 3 through 8 are elevations on a reduced scale indicating the progressive steps in the method of manufacturing a curing bag embodying the present invention;

Fig. 9 is a modified form of the curing bag construction shown in Fig. 2.

In practicing the invention, I first form of green or partially or completely vulcanized rubber, an inner tube or hollow-core 10, best shown in Fig. 3. It is to be noted that each end of the tube has a valve stem extending therethrough; however, it is to be understood that only one end may have a valve stem as would ordinarily be the case when air is used as the medium for internal curing bag pressure. The tube may be formed straight, but I prefer to form it initially in the arc of a circle and in the shape it will occupy in the finished bag when the bag is in service. Next a cover strip 11 of proper length and width is cut from a sheet of rubber reinforced with a plurality of parallel wire strain members 12 (see Fig. 1) although, as indicated hereinabove, the strain members may be composed of any material found to be satisfactory. The inner tube, after it has been formed as shown in Fig. 3, may be buffed, or cemented, or both, after which it is covered with the sheet 11 with the strain members extending longitudinally of the bag. The cover strip 11 is cut somewhat longer than the length of the tube 10 and said cover strip is initially wrapped about said tube with edges of the cover extending beyond the ends of the inner tube or core, as will be seen by reference to Fig. 4. The extended ends of the cover are slit into relatively narrow strips 13 by the simple expedient of cutting or tearing the rubber a distance between the strain members, such tears being made at intervals along the edge of the cover as will also be seen by reference to Fig. 4. After the strips 13 have been formed they are individually drawn inwardly over the surface of the end of the bag the strips converging at the valve stem 14 from which point they are led axially outwardly and evenly distributed along and about the valve stem forming the strips into a cluster, generally indicated as A. A metal ring 15 of proper size and strength is next slipped over the end of the cluster A and pressed against the converged strips 13 at the base of said cluster thus pressing the said strips 13 firmly against the end of the tube 10 as will be best seen by reference to Fig. 5. The outer end portions of the strips are next folded back by the strips in the cluster A being separately drawn over the ring 15 radially outwardly and downwardly against the converging portions of said strips, said outwardly extending portions of the strips diverging from said ring. Before the strips 13 are turned back out of the cluster a strip of rubberized fabric 16 is so positioned on the end of the bag over the converging portion of strips 13 that the fabric strip 16 will underlie the ends of the strip 13 and improve the bind between the strips 13 and provide protection against cutting by the ends of said strips. An additional rubberized fabric strip 17 is centered over the ends of said strips 13. While strips 16 and 17 have been shown as being composed of rubberized fabric it is to be understood that rubber strips or strips or layers of other material may be used instead of rubberized fabric.

When the strips 13 have been turned back as described, an open space is left in the ring. This space is filled in with rubber 18 as illustrated in Fig. 6. A rubber washer 19 is centered about the ring 15 over the strips 13 to even up the end surface of the bag with the axially projecting ring and strips, as will be seen by reference to Fig. 2. Next a concavo-convex rigid plate 20, having a central hole 21, is slid over said valve stem and seated against the end of the bag over said strips 13 and ring 15. This plate may be composed of metal which may be treated to facilitate a union between it and the rubber. The valve stem 14 has a base portion 22 about which an additional rubber base 23 is formed as will be understood by those familiar with the art. It has been found desirable to force plate 20 with considerable force against the end of the assembly and to accomplish this a nut 31 threaded on the valve stem 14 is run down tight against the plate 20 thus squeezing that portion of the end of the bag which intervenes the valve base 22, 23 and the rigid plate 20. After the said squeezing operation the nut 31 is removed and a second rubber washer 24 similar to washer 19 is centered about the plate 20. Next a strip of rubber 30 is wound upon the end of the assembly, after which a relatively heavy layer or cap of rubber 25 is applied to the end of the assembly and covers substantially the entire end thereof. A base bag reinforcement in the form of a layer of rubber 26 abuts the edges of said cap 25 and extends to and abuts a similar cap on the other end, not shown, of said bag. A bag cover 27 is next applied over the entire assembly after which the usual tube washer 28 and a valve nut 29 are applied at the valve stem, said nut holding said washer firmly against the bag end. The assembly is next laid in a mold and vulcanized in the usual manner employed in molding sectional curing bags.

The construction at both ends of the curing bag is the same on bags having two valve stems. On bags having one valve stem the construction at the end having a valve stem is the same as described hereinabove; however, at the end where a valve stem is not needed, as where air is used for internal bag pressure, a dumy valve may be built in for the purpose of building a bag end construction identical with that described above, or a regular valve stem may be built in and kept closed by means of a valve or cap. It has been found, however, that an end construction without a valve stem may be built the same as that disclosed herein in connection with a valve stem except, of course, the valve stem and the queezing operation are omitted as are also the rubber washer 24, and the tube washer 28, and the nut 29. A bag end construction without a valve stem is shown in Fig. 9 wherein the components have been given reference numerals corresponding to similar components in Fig. 2 with exponent "a" added. In the construction shown in Fig. 9 it is to be noted that a concavo-convex plate 20a is placed between an inner tube 10a and a ring 15a under strips 13a. This is necessary to prevent the internal curing bag pressure from blowing out through the center of the ring 15a. A rubber washer 19a is used for the same reason as washer 19 in the construction shown in Fig. 2. With the exceptions noted, the construction shown in Fig. 9 is the same and the method of building is the same as shown and described hereinabove in the remarks relative to the form of the invention shown in Fig. 2, and for that reason a detailed discussion would add nothing to the present disclosure and is not repeated.

It is to be understood that in this application "rubber" is intended to include rubber-like materials such as for example the elastomers. It will be obvious to those familiar with the art that, if desired, more than one reinforced ply may be built into a curing bag without departing from the spirit of the present invention. Although a single embodiment and a modification thereof has been illustrated and described in specific detail, it is to be understood that the disclosure is merely illustrative and is not designed to restrict the invention either in scope or spirit except as such limitations are indicated in the appended claims.

What is claimed is:

1. A sectional curing bag comprising an elongated closed-end hollow rubber core, a rubber sheet having spaced parallel reinforcing wires therein enclosing said core with said wires extending longitudinally of said core, wire anchoring rings on the ends of said bag, said wires extending the full length of the sides of said bag and converging over said bag's closed-ends, said wires extending to and through said anchoring rings and being doubled back diverging from said rings with the doubled back portion of said wires being in contact with the end of said bag, and a layer of rubber forming an outer cover for the finished bag.

2. A tire repair bag comprising a hollow closed-end rubber core, said core having a valve stem centrally located in at least one end thereof, a sheet of rubber reinforced with parallel wires covering the entire surface of said core except at a small area adjacent to said valve stem, said wires extending longitudinally of said bag, said sheet being slit at its ends into relatively narrow strips which in the first instance converge toward said valve stem, a ring about said valve stem, said strips being looped through said ring and doubled back and in contact with the end portion of said bag, said strips diverging from said ring in the strip's doubled back position, bag protective material under and over the ends of said sheet strips, a rigid concavo-convex plate with a central hole therein mounted about said valve stem and over said ring, bag end reinforcing caps, bag base reinforcing means extending between said end caps, a rubber cover over the entire surface of said bag, and a tube washer held firmly against the end of said bag by means of a nut in threaded relation with said valve stem.

3. A tire repair bag comprising a hollow closed-end rubber core, said core having a valve stem centrally located in at least one end thereof, a sheet of rubber reinforced with parallel wires covering the entire surface of said core except at a small area adjacent said valve stem, said wires extending longitudinally of said bag, said sheet being slit at its ends into relatively narrow strips which in the first instance converge toward said valve stem, a ring about said valve stem, said strips being looped through said ring and doubled back and in contact with the end portion of said bag, said strips diverging from said ring in the strip's doubled back position, bag protective material under and over the ends of said sheet strips, bag and reinforcing caps, bag base reinforcing means extending between said end caps, a rubber cover over the entire surface of said bag, and a tube washer held firmly against the end of said bag by means of a nut in threaded relation with said valve stem.

4. A tire repair curing bag comprising a hollow closed-end rubber core, said core having a valve stem in one end only, said valve stem having a valve base and being centrally located in an end of the bag, a sheet of rubber reinforced with parallel wires covering the entire surface of said core except a small area adjacent said valve stem, said wires extending longitudinally of said bag, said sheet being slit at its ends into narrow strips which in their first length converge toward the center of the bag ends, a ring about said valve stem, with said strips of said sheet adjacent said stem being looped through said ring and being doubled back and in contact with the end portion of said bag, said strips in their second length diverging from said ring and in contact with the end portion of the bag, a rigid concavo-convex plate having a central hole therethrough mounted about said valve stem and over said ring, the bag end not having a valve stem being constructed the same as the bag end having a valve stem except said concavo-convex plate with a central hole therein is omitted and a rigid concavo-convex plate whose diameter is greater than the outside diameter of said ring and without a central hole is positioned under said end strips under said rings, both ends of said bag having reinforcing end caps, said bag having a reinforced base portion and a rubber cover.

5. The method of making sectional curing bags that comprises constructing an elongated expansible closed-end hollow core with an externally threaded valve stem transversing the core wall at at least one of said ends and with a valve base on the inside of said core, covering the sides of said core with a layer of rubber reinforced with spaced parallel wire strain members extending lengthwise of said core, slitting the end portions of said layer thereby forming a plurality of relatively narrow strips, working said strips radially inwardly against the ends of said bag, said strips converging at the central portion of said ends, gathering the outer end portions of said strips into clusters projecting axially of said core and axially outwardly beyond said ends, attaching a layer of protective material on the ends of said bag in a position which will underlie the ends of said strips in the finished curing bag, placing rings over said clusters and at the bases thereof, working said outer end portions of said strips out of said clusters radially outwardly over said rings and against the built up ends of said core in such manner as to cause the outer end portions of said strips to lie over the inner end portions of said strips, whereby said rings are thus held in loops formed by said end portions and the ends of said strips overlying said protective strip, applying a strip of protective material over the ends of said strips, placing filling material in said ring whereby any open space therein is filled, temporarily placing a rigid plate having a central hole therethrough on said valve stem, backing said plate with a nut in threaded engagement with said stem and thereby compressing a portion of the said bag end between said plate and said stem base, removing said plate and nut, attaching reinforcing end caps, attaching base reinforcement, covering the assembly with an outer layer, placing tube washers and valve nuts in permanent position on said valve stem and vulcanizing the assembly in a mold.

6. In a sectional curing bag, the combination of closely spaced small flexible strain members and anchoring rings, said strain members being imbedded in a layer of rubber and extending longitudinally the entire length of the sides of the bag and a distance over the bag ends, said strain members being substantially parallel intermediate the ends of the bag and converging on the ends of the bag toward the center of said ends, a ring built in the central portion of each end of the bag with the ends of said strain members looped through said rings with the ends of the strain members doubled back against the ends of the bag, bag end reinforcing rubber covering said rings and doubled back ends, the rubber in the bag being vulcanized.

7. In a sectional curing bag, the combination of closely spaced wire strain members and strain member anchoring rings, said strain members being imbedded in rubber and extending longitudinally of the bag the entire length of the sides thereof and a distance over the bag ends, said strain members being substantially parallel intermediate the ends of the bag and converging on the ends of the bag toward the center of said ends, a ring built in each end of the bag with the ends of said strain members extending through said rings with the extended ends of the strain members being doubled back against the ends of the bag, bag end reinforcing rubber covering said doubled back ends, the rubber in said bag being vulcanized.

8. A curing bag of the type described provided with end strain member anchor rings, numerous slender spaced-apart flexible substantially inextensible longitudinally extending strain members, said strain members being imbedded in a layer of rubber and extending from the underside of and outwardly through said rings, said members being evenly distributed around the ring and being turned back over the ring against the ends of the bag, said rings and strain member end portions being covered with bag end reinforcing material vulcanized to the ends of the bag whereby the turned-back ends of the strain members are prevented from being drawn through said anchor rings.

9. A curing bag of the type described comprising end strain member anchor rings, at least one layer of numerous closely spaced longitudinally extending wire strain members, said strain members being imbedded in a layer of rubber and extending from the underside of and outwardly through said rings, said rings being disposed in the central portions of the ends of the bag, said strain members being evenly distributed around the ring and being turned back over the ring against the ends of the bag, said rings and strain member end portions being covered with bag end reinforcing material vulcanized to the ends of the bag whereby the turned-back ends of the strain members are prevented from being drawn through said anchor rings when the bag is in service.

10. A curing bag of the type described comprising numerous closely spaced small wires extending longitudinally of said bag in parallel relation in the portion of the bag intermediate its ends, strain member anchor rings built in and disposed in the central portions of the ends of the bag, the end portions of said strain members converging on the ends of the bag toward said rings and being looped therethrough with the end portions of the strain members extending through the rings diverging from said rings and being disposed against the ends of the bag with bag end reinforcing material vulcanized thereover whereby the ends of said strain members are retained in position.

11. A curing bag of the type described provided with end strain member anchor rings and numerous longitudinally extending closely spaced strain members in the form of small wires in parallel relation in the portions intermediate the ends of the bag, the end portions of said strain members extending through and being turned back over the rings against the ends of the bag with bag reinforcing material vulcanized over said rings and strain member ends.

JAMES E. CHARNES.

REFERENCES CITED

The following references are of record in the file of this patent:

UNITED STATES PATENTS

| Number | Name | Date |
| --- | --- | --- |
| 1,337,707 | Johnson et al. | Apr. 20, 1920 |
| 1,412,799 | Burdette | Apr. 11, 1922 |
| 2,308,268 | Corson | Jan. 12, 1943 |